(12) United States Patent
Kakivaya et al.

(10) Patent No.: US 7,685,288 B2
(45) Date of Patent: Mar. 23, 2010

(54) AD-HOC SERVICE DISCOVERY PROTOCOL

(75) Inventors: Gopala Krishna R. Kakivaya, Sammamish, WA (US); Jeffrey C. Schlimmer, Redmond, WA (US); Christian Huitema, Clyde Hill, WA (US); Richard L. Hasha, Seattle, WA (US); Don Box, Bellevue, WA (US); Jeffrey B. Parham, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1419 days.

(21) Appl. No.: 10/611,790

(22) Filed: Jun. 30, 2003

(65) Prior Publication Data
US 2004/0267876 A1  Dec. 30, 2004

(51) Int. Cl.
*G06F 15/16* (2006.01)
(52) U.S. Cl. .................. 709/227; 709/220; 709/204
(58) Field of Classification Search .................. 709/227, 709/220, 221, 204, 205
See application file for complete search history.

(56) References Cited

U.S. PATENT DOCUMENTS 7,272,636 B2 * 9/2007 Pabla ........................ 709/216

2002/0156875 A1 * 10/2002 Pabla ........................ 709/220

OTHER PUBLICATIONS

Veizades et al., "Service Location Protocol," *Internet, RFC 2165*, Jun. 1997.
Guttman et al., "Service Location Protocol, Version 2," *Internet, RFC 2608*, Jun. 1999.
Goland et al., "Simple Service Discovery Protocol/1.0, Operating Without an Arbiter," *Internet Engineering Task Force, Internet Draft*, Oct. 28, 1999.
Cheshire, "DNS-Based Service Discovery," *Standards Track, Internet Draft*, Dec. 12, 2002.
Cheshire, "Performing DNS Queries via IP Multicast," *Standards Track, Internet Draft*, Dec. 12, 2002.

* cited by examiner

*Primary Examiner*—David Lazaro
(74) *Attorney, Agent, or Firm*—Klarquist Sparkman, LLP

(57) ABSTRACT

An ad-hoc discovery protocol improves reliability, security and scalability of multicast and server-based discovery. In switching from multicast to server-based discovery, the discovery client is made responsible for multicast suppression, and not discoverable devices with services. Messages include message identifier and time-to-live parameters to detect recast queries and avoid duplicating replies. A device's announcement message includes endpoint identifier, configuration number and stateless boot time parameters to detect changed device configuration and rebooted state for refreshing cached device and service descriptions. Paging parameters allow a discovery client to control the number of discovery responses returned at a time from a discovery server.

18 Claims, 17 Drawing Sheets

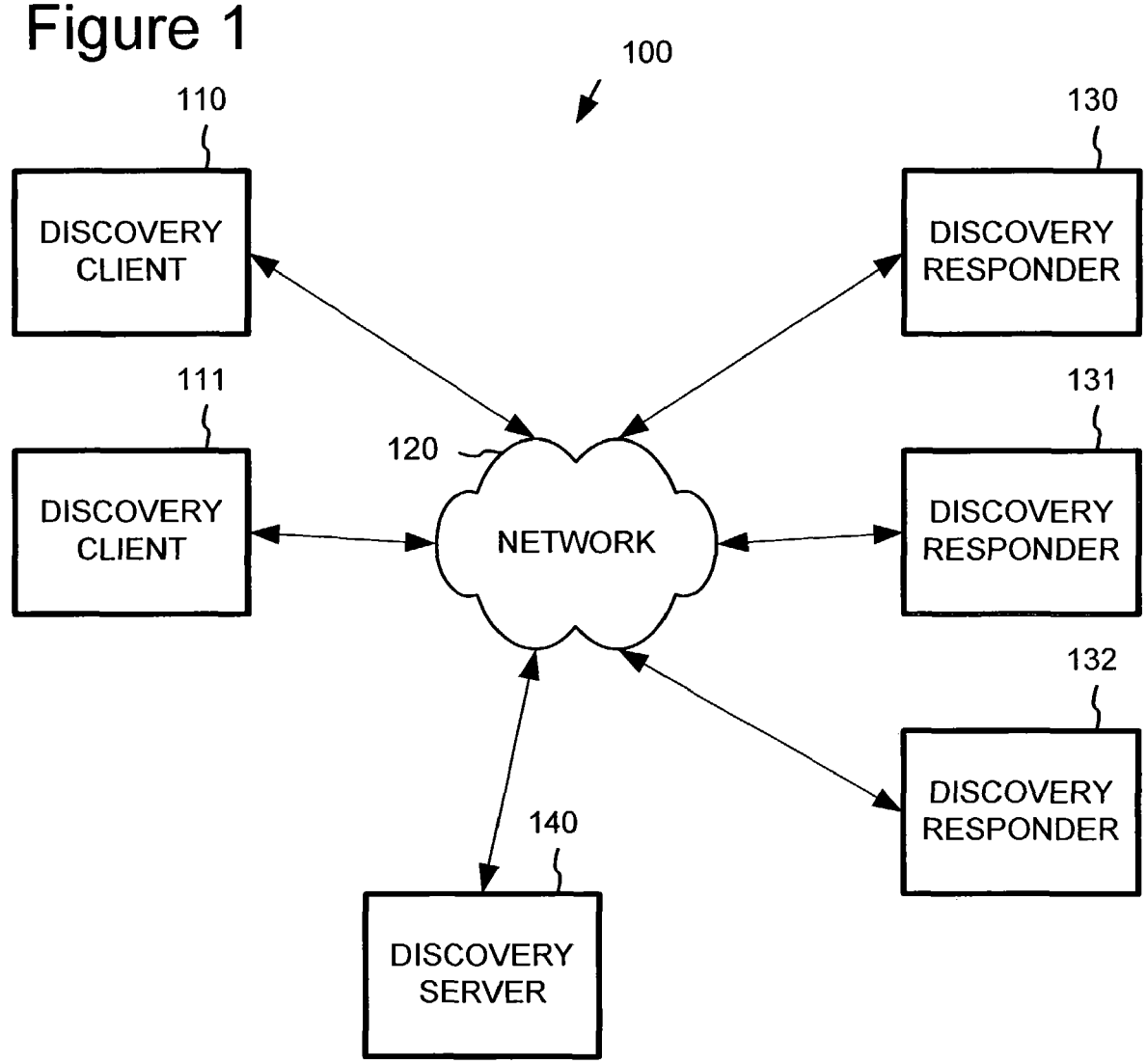

Figure 2A

```
<wsdl:definitions
    xmlns:wsdl="http://schemas.xmlsoap.org/wsdl/"
    xmlns:xs="http://www.w3.org/2001/XMLSchema"
    xmlns:disc="http://schemas.upnp.org/2003/01/discovery"
    targetNamespace="http://schemas.upnp.org/2003/01/discovery"
>

<wsdl:types>
        <xs:schema>
            <xs:import namespace="http://schemas.xmlsoap.org/ws/2002/12/discovery"
                                        schemaLocation="discovery.xsd" />
        </xs:schema>
    </wsdl:types>

<!-- this portType is implemented by the multicast channel in ad hoc.mode -->
    <wsdl:portType name="ServiceDiscovery" >
        <wsdl:operation name="AnnounceService" >
            <wsdl:input message="disc:AnnounceService" />
        </wsdl:operation>
        <wsdl:operation name="ByeBye" >
            <wsdl:input message="disc:ByeBye" />
        </wsdl:operation>
        <wsdl:operation name="Find" >
            <wsdl:input message="disc:Find" />
        </wsdl:operation>
    </wsdl:portType>

<wsdl:portType name="DiscoverySink" >
        <wsdl:operation name="FindResponse" >
            <wsdl:input message="disc:FindResponse" />
        </wsdl:operation>
    </wsdl:portType>

< -- this portType is implemented by the discovery server -->
    <wsdl:portType name="DiscoveryServer" >
        <wsdl:operation name="AnnounceService" >
            <wsdl:input message="disc:AnnounceService"/>
            <wsdl:output message="disc:AnnounceServiceResponse"/>
        </wsdl:operation>
        <wsdl:operation name="ByeBye" >
            <wsdl:input message="disc:ByeBye"/>
            <wsdl:output message="disc:ByeByeResponse"/>
        </wsdl:operation>
        <wsdl:operation name="Find" >
            <wsdl:input message="disc:Find"/>
            <wsdl:output message="disc:FindResponse"/>
        </wsdl:operation>
    </wsdl:portType>
```

Figure 2B

```
< -- subordinate message constructs -->
<wsdl:message name="Find" >
    <wsdl:part name="parameters" element="disc:Find" />
</wsdl:message>
<wsdl:message name="FindResponse" >
    <wsdl:part name="parameters" element="disc:FindResponse" />
</wsdl:message>
<wsdl:message name="AnnounceService" >
    <wsdl:part name="parameters" element="disc:AnnounceService" />
</wsdl:message>
<wsdl:message name="AnnounceServiceResponse" >
    <wsdl:part name="parameters" element="disc:AnnounceServiceResponse" />
</wsdl:message>
<wsdl:message name="ByeBye" >
    <wsdl:part name="parameters" element="disc:ByeBye" />
</wsdl:message>
<wsdl:message name="ByeByeResponse" >
    <wsdl:part name="parameters" element="disc:ByeByeResponse" />
</wsdl:message>
</wsdl:definitions>
```

Figure 3A

```xml
<xs:schema
    xmlns:xs="http://www.w3.org/2001/XMLSchema"
    xmlns:wsp="http://schemas.xmlsoap.org/ws/2002/12/policy"
    xmlns:disc="http://schemas.upnp.org/2003/01/discovery"
    targetNamespace="http://schemas.upnp.org/2003/01/discovery"
    elementFormDefault="unqualified"
>
    <xs:import namespace="http://schemas.xmlsoap.org/ws/2002/12/policy"
schemaLocation="Policy.xsd"/>

<!-- these four GEDs are discovery message formats (ignoring header content)
-->
    <xs:element name="Find" type="disc:FindType" />
    <xs:element name="FindResponse" type="disc:FindResponseType" />
    <xs:element name="AnnounceService" type="disc:AnnounceServiceType" />
    <xs:element name="AnnounceServiceResponse"
type="disc:AnnounceServiceResponseType" />
    <xs:element name="ByeBye" type="disc:ByeByeType" />
    <xs:element name="ByeByeResponse" type="disc:ByeByeResponseType" />

<!-- FindContext type -->
    <xs:complexType name="FindContext" >
        <xs:sequence>
            <xs:element name="filterContext" type="xs:anyType" minOccurs="0"/>
            <xs:element name="callbackContext" type="xs:anyType" minOccurs="0"/>
        </xs:sequence>
    </xs:complexType>
    <xs:element name="FindContext" type="disc:FindContext"/>

<!-- Find message type -->
    <xs:complexType name="FindType" >
        <xs:sequence>
            <xs:element name="scope" type="xs:anyURI" minOccurs="0"/>
            <xs:element name="key" type="xs:anySimpleType" minOccurs="0"/>
            <xs:element name="filter" type="xs:string" minOccurs="0"/>
            <xs:element name="findContext" type="disc:FindContext"
minOccurs="0"/>
            <xs:element name="sizeLimit" type="xs:int" minOccurs="0"/>
            <xs:element name="pageContext" type="xs:anyType" minOccurs="0"/>
        </xs:sequence>
    </xs:complexType>

<!-- Three predefined key types of the Find message -->
    <xs:simpleType  name="Type" >
        <xs:restriction base="xs:QName"/>
    </xs:simpleType>
    <xs:simpleType  name="DeviceType" >
        <xs:restriction base="xs:QName"/>
    </xs:simpleType>
    <xs:simpleType  name="EndpointID" >
        <xs:restriction base="xs:string"/>
    </xs:simpleType>
```

Figure 3B

```xml
<!-- FindResponse message type -->
<xs:complexType name="FindResponseType" >
    <xs:sequence>
        <xs:element name="entries" type="disc:ServiceEntries"/>
        <xs:element name="callbackContext" type="xs:anyType" minOccurs="0"/>
        <xs:element name="pageContext" type="xs:anyType" minOccurs="0"/>
        <xs:element name="status" type="disc:Status" minOccurs="0"/>
    </xs:sequence>
</xs:complexType>

<xs:complexType name="Status">
    <xs:sequence>
        <xs:element name="details" type="xs:anyType"/>
        <xs:element name="description" type="xs:string" minOccurs="0"/>
    </xs:sequence>
</xs:complexType>

<!-- Some standard failure types -->
<xs:complexType name="SizeLimitExceeded"/>
<xs:complexType name="InvalidPageContext"/>

<!-- Announce message type -->
<xs:complexType name="AnnounceServiceType" >
    <xs:sequence>
        <xs:element name="endpointID" type="xs:anyURI"/>
        <xs:element name="configNumber" type="xs:unsignedInt"/>
        <xs:element name="statelessBootTime" type="xs:unsignedInt"/>
    </xs:sequence>
</xs:complexType>

<!-- AnnounceResponse message type -->
<xs:complexType name="AnnounceServiceResponseType"/>

<!-- ByeBye message type -->
<xs:complexType name="ByeByeType">
    <xs:sequence>
        <xs:element name="endpointID" type="xs:anyURI"/>
        <xs:element name="statelessBootTime" type="xs:unsignedInt"/>
    </xs:sequence>
</xs:complexType>

<!-- ByeByeResponse message type -->
<xs:complexType name="ByeByeResponseType"/>

<!-- The following attribute group is defined to support the
     SOAP reference(pointer) semantics -->
<xs:attributeGroup name="SOAPReferenceAttributes">
    <xs:attribute name="id"    type="xs:ID"/>
    <xs:attribute name="idref" type="xs:IDREF"/>
</xs:attributeGroup>
```

Figure 3C

```xml
    <!-- Discovery SOAP headers -->
    <xs:complexType name="Identifier">
        <xs:simpleContent>
            <xs:extension base="xs:anyURI">
                <!-- Any attributes (more precisely qualified global
attributes)
                    like soap:mustUnderstand -->
                <xs:anyAttribute processContents="lax"/>
            </xs:extension>
        </xs:simpleContent>
    </xs:complexType>
    <xs:element name="MessageID" type="disc:Identifier"/>
    <xs:element name="CorrelationID" type="disc:Identifier"/>
    <xs:element name="To" type="disc:Identifier"/>

<xs:complexType name="ReplyTo">
        <xs:sequence>
            <xs:element name="to" type="xs:anyURI"/>
            <xs:element name="transportAddress" type="xs:anyURI"/>
        </xs:sequence>
        <xs:anyAttribute processContents="lax"/>
    </xs:complexType>
    <xs:element name="ReplyTo" type="disc:ReplyTo"/>

<xs:complexType name="Idempotent">
        <!-- Any attributes (more precisely qualified global attributes)
            like soap:mustUnderstand -->
        <xs:anyAttribute processContents="lax"/>
    </xs:complexType>
    <xs:element name="Idempotent" type="disc:Idempotent"/>

<xs:complexType name="TTL">
        <xs:simpleContent>
            <xs:extension base="xs:int">
                <!-- Any attributes (more precisely qualified global
attributes)
                    like soap:mustUnderstand -->
                <xs:anyAttribute processContents="lax"/>
            </xs:extension>
        </xs:simpleContent>
    </xs:complexType>
    <xs:element name="TTL" type="disc:TTL"/>
```

Figure 3D

```xml
<!-- A set of common types -->
<xs:simpleType name="TypeInfo">
    <xs:list itemType="xs:QName"/>
</xs:simpleType>

<xs:element name="anyType" type="xs:anyType"/>
<xs:complexType name="anyTypes">
    <xs:sequence>
        <xs:element ref="disc:anyType" minOccurs="0" maxOccurs="unbounded"/>
    </xs:sequence>
</xs:complexType>

<xs:element name="Scope" type="xs:anyURI" substitutionGroup="disc:anyType"/>
<xs:complexType name="Scopes">
    <xs:complexContent>
        <xs:restriction base="disc:anyTypes">
            <xs:sequence>
                <xs:element ref="disc:Scope" minOccurs="0" maxOccurs="unbounded"/>
            </xs:sequence>
        </xs:restriction>
    </xs:complexContent>
</xs:complexType>

<xs:complexType name="EndpointInfo" >
    <xs:sequence>
        <xs:element name="endpointID" type="xs:anyURI"/>
        <xs:element name="implementationType" type="xs:QName" minOccurs="0"/>
        <xs:element name="typeInfo" type="disc:TypeInfo" minOccurs="0"/>
        <xs:element name="policy" type="wsp:PolicyExpression" minOccurs="0"/>
        <xs:element name="extensions" type="disc:anyTypes" minOccurs="0"/>
    </xs:sequence>
    <xs:attributeGroup ref="disc:SOAPReferenceAttributes"/>
</xs:complexType>
<xs:element name="EndpointInfo" type="disc:EndpointInfo" substitutionGroup="disc:anyType"/>
<xs:complexType name="EndpointInfos">
    <xs:complexContent>
        <xs:restriction base="disc:anyTypes">
            <xs:sequence>
                <xs:element ref="disc:EndpointInfo" minOccurs="0" maxOccurs="unbounded"/>
            </xs:sequence>
        </xs:restriction>
    </xs:complexContent>
</xs:complexType>

<!-- Transport address policy assertion -->
<xs:element name="Address" type="xs:anyURI"/>
```

Figure 3E

```xml
<!-- The following is the definition of the service schema entry -->
<xs:complexType name="ServiceEntry" >
    <xs:sequence>
        <xs:element name="friendlyName" type="xs:string" minOccurs="0"/>
        <xs:element name="configNumber" type="xs:unsignedInt" minOccurs="0"/>
        <xs:element name="scopes" type="disc:Scopes" minOccurs="0"/>
        <xs:element name="endpointInfo" type="disc:EndpointInfo"/>
        <xs:element name="deploymentProperties" type="disc:anyTypes" minOccurs="0"/>
    </xs:sequence>
    <xs:attributeGroup ref="disc:SOAPReferenceAttributes"/>
</xs:complexType>
<xs:element name="ServiceEntry" type="disc:ServiceEntry" substitutionGroup="disc:anyType"/>
<xs:complexType name="ServiceEntries">
    <xs:complexContent>
        <xs:restriction base="disc:anyTypes">
            <xs:sequence>
                <xs:element ref="disc:ServiceEntry" minOccurs="0" maxOccurs="unbounded"/>
            </xs:sequence>
        </xs:restriction>
    </xs:complexContent>
</xs:complexType>

<!-- The following is the definition of the discovery service schema entry -->
<xs:complexType name="DiscoveryServiceEntry" >
    <xs:complexContent>
        <xs:extension base="disc:ServiceEntry">
            <xs:sequence>
                <xs:element name="supportedScopes" type="disc:Scopes"/>
            </xs:sequence>
        </xs:extension>
    </xs:complexContent>
</xs:complexType>
<xs:element name="DiscoveryServiceEntry" type="disc:DiscoveryServiceEntry" substitutionGroup="disc:ServiceEntry"/>
<xs:complexType name="DiscoveryServiceEntries">
    <xs:complexContent>
        <xs:restriction base="disc:ServiceEntries">
            <xs:sequence>
                <xs:element ref="disc:DiscoveryServiceEntry" minOccurs="0" maxOccurs="unbounded"/>
            </xs:sequence>
        </xs:restriction>
    </xs:complexContent>
</xs:complexType>
```

Figure 3F

```xml
<!--The following is the definition of the device schema entry -->
<xs:complexType name="DeviceEntry" >
    <xs:complexContent>
        <xs:extension base="disc:ServiceEntry">
            <xs:sequence>
                <xs:element name="manufacturerName" type="xs:string"/>
                <xs:element name="serialNumber" type="xs:string"/>
                <xs:element name="entries" type="disc:ServiceEntries" minOccurs="0"/>
            </xs:sequence>
        </xs:extension>
    </xs:complexContent>
</xs:complexType>
<xs:element name="DeviceEntry" type="disc:DeviceEntry" substitutionGroup="disc:ServiceEntry"/>
<xs:complexType name="DeviceEntries">
    <xs:complexContent>
        <xs:restriction base="disc:ServiceEntries">
            <xs:sequence>
                <xs:element ref="disc:DeviceEntry" minOccurs="0" maxOccurs="unbounded"/>
            </xs:sequence>
        </xs:restriction>
    </xs:complexContent>
</xs:complexType>
</xs:schema>
```

Figure 4

```
<entry xsi:type="upnp:PrinterCopierDeviceEntry"> <!-- PrinterCopierDeviceEntry
extends
      DeviceEntry which in-turn extends
      ServiceEntry -->
    <friendlyName>XX Color Printer-Copier in the den</friendlyName>
    <configNumber>28945</configNumber>
    <scopes>
        <upnp:scope>/myhouse/floor1/den</upnp:scope>
        <upnp:scope>/mymachine/devices/usb</upnp:scope>
    <scopes>
    <endpointInfo>
        <endpointID>uuid:94256bb9-edda-4947-9d54-9f990b5f4ff8</endpointID>
        <implementationType xmlns:x="http://xx.com/printercopiers/
">x:XPrinterCopier</implementationType>
        <policy>
          <wsp:ExactlyOne wsp:Usage="wsp:Required">
             <disc:Address>tcp://[FF80::1234:5678:90AB:CDEF]:1900/</
disc:Address>
             <disc:Address>http://my-home.example.net/printerCopier/</
disc:Address>
          </wsp:ExactlyOne>
            <wsp:Authentication ......./>
        </ policy>
    </endpointInfo>
    <manufacturerName>XX Company< manufacturerName> <!-- DeviceEntry fields -->
    <serialNumber>XX-Printer-12345</serialNumber>
    <entries>
        <upnp:serviceEntry>
           <friendlyName>XX Color printer service in the den</friendlyName>
           <endpointInfo>
              <endpointID>uuid:7b7ee0f6-d5a0-4e56-8fe6-1e56c8ade98d</endpointID>
              <implementationType xmlns:x="http://xx.com/printers/">x:XPrinter</
implementationType>
              <typeInfo xmlns:upnp="upnp.org:v2:printers">upnp:StandardPrinter</
typeInfo>
              <policy>
                 <disc:Address>tcp://192.168.1.1:95/Printer</disc:Address>
              </policy>
           </endpointInfo>
        </upnp:ServiceEntry>
        <upnp:serviceEntry>
           <friendlyName>XX Color copier service in the den</friendlyName>
           <endpointInfo>
              <endpointID>uuid:15a38098-82dc-4b6d-8355-6ea29c8e832f</endpointID>
              <implementationType xmlns:x="http://xx.com/copiers/">x:XCopier</
implementationType>
           </endpointInfo>
        </upnp:ServiceEntry>
    </entries>
    <color>true</color> <!-- PrinterEntry fields -->
    <supportedPaperSizes>A4 Legal</supportedPaperSizes>
    <supportedOrientations>Portrait Landscape</ supportedOrientations>
</entry>
```

Figure 5

```
<soap:Envelope>
    <soap:Header>
        <disc:MessageID >uuid:a56a9e10-7a79-4840-82a4-626428ab6499</
disc:MessageID>
        <disc:To>http://schemas.upnp.org/2003/01/discovery/discovery-uri</disc:To>
        <disc:ReplyTo>  <!-- send responses here -->
            <to>target-for-response</to>
            <transportAddress>http://myclient.mycompany.net/soap</
transportAddress>
        </disc:ReplyTo>
        <disc:Idempotent/>
        <disc:TTL>60</disc:TTL>              <!-- ttl for this message expressed in
seconds -->
    </soap:Header>
    <soap:Body>
        <disc:Find xmlns:disc="http://schemas.upnp.org/2003/01/discovery/">
            <scope>/myhouse/floor1</scope>
            <key xsi:type="disc:DeviceType"
xmlns:qns="upnp.org:v2:Printers">qns:Printer</key>
            <sizeLimit>50</sizeLimit>
            <pageContext/>
        </disc:Find>
    </soap:Body>
</soap:Envelope>
```

Figure 6A

```
<soap:Envelope>
    <soap:Header>
        <disc:MessageID>uuid:34f1fd44-ad28-4841-b51c-26b20c779047</disc:MessageID>
        <disc:CorrelationID>uuid:a56a9e10-7a79-4840-82a4-626428ab6499</disc:CorrelationID>
        <disc:To>target-for-response</disc:To>
    </soap:Header>
    <soap:Body>
        <disc:FindResponse>
            <entries>
                <entry xsi:type="upnp:PrinterCopierDeviceEntry"> <!--
PrinterCipierDeviceEntry extends DeviceEntry which in-turn extends ServiceEntry -->
                <friendlyName>XX Color Printer-Copier in the den</friendlyName>
                <configNumber>28945</configNumber>
                <scopes>
                    <upnp:scope>/myhouse/floor1/den</upnp:scope>
                    <upnp:scope>/mymachine/devices/usb</upnp:scope>
                <scopes>
                <endpointInfo>
                    <endpointID>uuid:94256bb9-edda-4947-9d54-9f990b5f4ff8</endpointID>
                    <implementationType xmlns:x="http://xx.com/printercopiers/">x:XPrinterCopier</implementationType>
                    <policy>
                        <wsp:ExactlyOne wsp:Usage="wsp:Required">
                            <disc:Address>tcp://[FF80::1234:5678:90AB:CDEF]:1900/</disc:Address>
                            <disc:Address>http://my-home.example.net/printerCopier/</disc:Address>
                        </wsp:ExactlyOne>
                        <wsp:Authentication ......./>
                    </policy>
                </endpointInfo>
                <manufacturerName>XX Company</manufacturerName> <!-- DeviceEntry fields -->
                <serialNumber>XX-Printer-12345</serialNumber>
```

Figure 6B

```
            <services>
                <upnp:serviceEntry>
                    <friendlyName>XX Color printer service in the den</friendlyName>
                    <endpointInfo>
                        <endpointID>uuid:7b7ee0f6-d5a0-4e56-8fe6-1e56c8ade98d</endpointID>
                        <implementationType xmlns:x="http://xx.com/printers/">x:XPrinter</implementationType>
                        <typeInfo xmlns:upnp="upnp.org:v2:printers">upnp:StandardPrinter</typeInfo>
                        <policy>
                            <disc:Address>tcp://192.168.1.1:95/Printer</disc:Address>
                        </policy>
                    </endpointInfo>
                </upnp:ServiceEntry>
                <upnp:serviceEntry>
                    <friendlyName>XX Color copier service in the den</friendlyName>
                    <endpointInfo>
                        <endpointID>uuid:15a38098-82dc-4b6d-8355-6ea29c8e832f</endpointID>
                        <implementationType xmlns:x="http://xx.com/copiers/">x:XCopier</implementationType>
                    </endpointInfo>
                </upnp:ServiceEntry>
            </services>
            <color>true</color> <!-- PrinterEntry fields -->
            <supportedPaperSizes>A4 Legal</supportedPaperSizes>
            <supportedOrientations>Portrait Landscape</supportedOrientations>
          </entry>
        </entries>
      </disc:FindResponse>
    </soap:Body>
</soap:Envelope>
```

Figure 7

```
<soap:Envelope>
    <soap:Header>
        <disc:MessageID >uuid:9e519214-8896-49fa-97e1-9936f10667ee</
disc:MessageID>
        <disc:To>http://schemas.upnp.org/2003/01/discovery/discovery-uri</
disc:To>
        <disc:ReplyTo>  <!-- send queries here -->
            <to>target-for-response</to>
            <transportAddress>http://myclient.mycompany.net/soap</
transportAddress>
        </disc:ReplyTo>
        <disc:Idempotent/>
        <disc:TTL>30</disc:TTL>          <!-- ttl for this message expressed in
seconds -->
    </soap:Header>
    <soap:Body>
        <disc:Announce>
            <endpointID>uuid:94256bb9-edda-4947-9d54-9f990b5f4ff8</
endpointID>
            <configNumber>74285</configNumber>
            <statelessBootTime>5643672</statelessBootTime>
        </disc:Announce>
    </soap:Body>
</soap:Envelope>
```

Figure 8

```
<soap:Envelope>
    <soap:Header>
        <disc:MessageID>uuid:dde0ab88-6928-4e4e-b7e4-93f7dfe5ff1d</
disc:MessageID>
        <disc:To>Http://schemas.upnp.org/2003/01/discovery/discovery-uri</
disc:To>
        <disc:Idempotent/>
        <disc:TTL>30</disc:TTL>          <!-- ttl for this message expressed in
seconds -->
    </soap:Header>
    <soap:Body>
        <disc:ByeBye>
                <endpointID>uuid:94256bb9-cdda-4947-9d54-9f990b5f4ff8</
endpointID>
                <statelessBootTime>5643672</statelessBootTime>
        </disc:ByeBye>
    </soap:Body>
</soap:Envelope>
```

Figure 9

```
t = 1000; // 1000 milliseconds
for (i =0; i<4; i++, t = 2*t)
{
        x = uniform_random(0, t);
        wait (x); // wait a random interval of x milliseconds
                if (server_is_configured)
                {
                        Send_Announce_Message_to_server();
                        if (successful_transmission)
                                Break;
                }else{
                        if (IPv4_capable)
                                Send_Announce_Message_to IPv4 URL();
                        if (IPv6_capable)
                                Send_Announce_Message_to IPv6 URL();
                }
}
```

AD-HOC SERVICE DISCOVERY PROTOCOL

COPYRIGHT AUTHORIZATION

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

TECHNICAL FIELD

The present invention relates to network communications protocols for discovery of devices and services on a data network.

BACKGROUND

Various discovery protocols have been proposed to enable a device (e.g., a user-operated device) to discover other devices and services on managed and unmanaged (ad-hoc) networks, without prior knowledge of the other devices and services. Examples include the Service Location Protocol, version 2 (SLPv2), described in Guttman et al., "Service Location Protocol, Version 2," IETF RFC 2608, June 1999; Rendevous by Apple Computer, Inc., described in Chesire, "DNS-based Service Discovery," IETF Internet Draft, December 2002 and Chesire, "Performing DNS queries via IP Multicast," IETF Internet Draft, December 2002; and the Simple Service Discovery Protocol (SSDP), described in Goland et al., "Simple Service Discovery Protocol/1.0, Operating without an Arbiter," IETF Internet Draft, April 2000. For various reasons, these other discovery protocols suffer limitations as to reliability, security and scalability.

SUMMARY

An ad-hoc service discovery protocol described herein improves upon other service discovery protocols in areas of reliability, security and scalability. The ad-hoc service discovery protocol generally involves 3 kinds of actors on a network: discovery clients (e.g., a controller, or like device seeking to discover services to control on the network), discovery responders (e.g., devices and services on devices, but possibly also controllers), and optionally a discovery server.

The described ad-hoc service discovery protocol supports server-based discovery (such as in an administered network of an enterprise or office environment), and defaults to multicast discovery in ad-hoc networks. For improved network scalability, the discovery client discovers and uses a discovery server if present, and otherwise resorts to multicast-based discovery. The discovery device simply responds to all matching discovery requests, whether from a discovery client or from a discovery server. This eliminates having the device switch modes from multicast-based to server-based discovery; if the device were to switch to a server-based mode and not notice failure of the discovery server, the device would be invisible from multicast-based discovery. In some described implementations, the ad-hoc service discovery protocol may also support a configured mode where devices can be configured to respond only to discovery from a discovery server.

The described ad-hoc service discovery protocol further enhances reliability and security by transmitting direct messages (e.g., discovery responses, and discovery requests directed to the discovery server) using the Transmission Control Protocol (TCP), rather than User Datagram Protocol (UDP). Unlike UDP, TCP guarantees delivery as well as order of delivery.

The described ad-hoc service discovery protocol also improves scalability of retransmitting (recasting) multicast messages. The messages have a header that includes a message identifier and time-to-live (TTL) parameter specifying a time interval over which the message may be recast. A discovery responder can then determine if a message to which it had previously responded is being recast, and avoid duplicating its response. In comparison, some other protocols require the discovery client to include "an already responded list" when recasting its discovery message, which identifies any discovery responders whose response it received. Such already responded lists increase the size of discovery messages, and increase message processing resource requirements, which limits scalability.

The described ad-hoc service discovery protocol further improves scalability and reliability by using an endpoint identifier, configuration number and stateless boot time in announcement messages of a service or device. The endpoint identifier is a unique identifier of the respective service or device.

The configuration number enables controlled caching of the description of the service or device. The configuration number is associated with the configuration of the service or device. If the configuration changes, then the configuration number also changes. When the announcement message is received, the recipient (e.g., discovery server or discovery client) can use the endpoint identifier to check for the presence of a cached description of the service or device in its local cache. The recipient then compares the configuration number to check whether the cached description is up to date. If the cached copy is current, the recipient does not need to further contact the device to retrieve its full description, which improves scalability.

The stateless boot time represents the stateless boot time of the service or device. When the device reboots in such a way as to lose its state, the stateless boot time updates (e.g., as a clock value or incremented boot counter). This allows the discovery client or discovery server to detect that the client has been rebooted, which then allows the discovery client or server to re-establish event subscriptions or like features that may be affected by the device's loss of state.

The described ad-hoc service discovery protocol also supports hierarchical scopes. The description of a service or device can specify a scope that identifies one or more associated logical or physical groupings of services or devices. A discovery server also can specify supported scopes for which it manages discovery on the network. A discovery client's discovery request (called a "find message") can optionally specify a scope.

Descriptions of services and devices in the described ad-hoc service discovery protocol are based on schemas that are taxonomized. For example, the schema of devices is based on that of services. A schema of a particular kind of device (e.g., a printer) is based on the schema for devices.

The described ad-hoc service discovery protocol further provides support for filters and paging in discovery queries. If a query involves a combination of properties to be matched in device or service descriptions, the discovery client can express the desired combination using a filter query parameter.

Further, the discovery client can use parameters in its discovery query to retrieve a single "page" amount of responses at a time from the discovery server (which, for example, can be a number of entries that can be displayed as a page by the discovery client). In one implementation, the discovery client can specify a size limit and page context in its discovery query. The discovery server responds with up to the size limit of matching entries in its cache of service and device descriptions, and returns the page context and status indicating whether the query is complete. The discovery client can continue to request further "pages" in subsequent queries using the size limit and returned page context.

Additional features and advantages of the invention will be made apparent from the following detailed description of embodiments that proceeds with reference to the accompanying drawings.

BRIEF DESCRIPTION OF THE DRAWINGS

FIG. 1 is a block diagram of a network architecture in which an ad-hoc discovery protocol is used.

FIG. 2 (including parts A-B) is a listing of an XML schema in Web Services Description Language (WSDL) format defining web services operations for messages in the ad-hoc discovery protocol.

FIG. 3 (including parts A-F) is a listing of an XML schema defining message types in the ad-hoc discovery protocol.

FIG. 4 is a listing of an example response containing a description of an example device.

FIG. 5 is a listing of an example find message in the ad-hoc service discovery protocol.

FIG. 6 (including parts A-B) is a listing of an example find response message in the ad-hoc service discovery protocol.

FIG. 7 is a listing of an example announcement message in the ad-hoc service discovery protocol.

FIG. 8 is a listing of an example bye-bye message in the ad-hoc service discovery protocol.

FIG. 9 is a pseudo-code listing of a procedure for a discovery responder to send an announcement message in the ad-hoc service discovery protocol.

DETAILED DESCRIPTION

Figure 10:
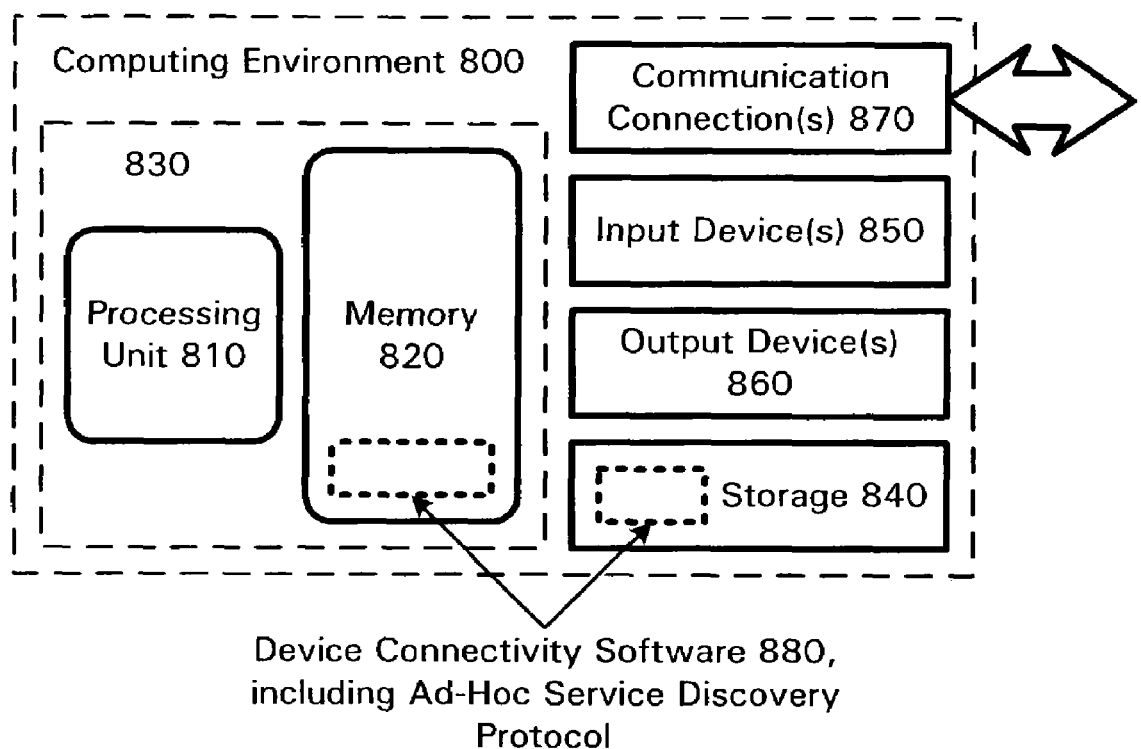
FIG. 10 is a block diagram of a suitable structure of computing devices for the network device architecture of the ad-hoc service discovery protocol of FIG. 1.

The following description is directed to improvements in ad-hoc discovery protocols. An exemplary application of an ad-hoc service discovery protocol incorporating these improvements is in a network environment of devices using a version of the Universal Plug and Play (UPnP) peer device networking protocol (e.g., as a replacement for the SSDP discovery protocol used in UPnP, version 1). UPnP is described in more detail in "Universal Plug and Play Device Architecture, version 1.0," Microsoft Corporation, Jun. 8, 2000; and "UPnP™ Device Architecture 1.0, version 1.0.1," UPnP Forum, May 6, 2003 (both documents being available from the UPnP Forum through its website at www.upnp.org). However, the improved ad-hoc service discovery protocol is not limited in application to use with UPnP, and can be adapted or applied for discovery in other computing and networking environments and applications.

General Networked Device Architecture Overview

FIG. 1 illustrates a network architecture 100 in which the ad-hoc service discovery protocol can be used. This network architecture 100 can be an arrangement of UPnP-compliant networked computing devices. As described for example in "UPnP™ Device Architecture 1.0, version 1.0.1," UPnP Forum, May 6, 2003, the UPnP device architecture involves two types of actors: devices, hosting UPnP-compliant services; and control points (or more simply controllers), who control the use of the services. The UPnP protocol lets controllers discover the devices and services hosted on the devices. There also may be cases involving discovery of the controllers, e.g., to establish security credentials. Further, there are also occasions in which connectivity between the devices is a server-based operation.

The network architecture 100 of the ad-hoc service discovery protocol generally engages three kinds of actors:

Discovery responders 130-132, usually devices and services on devices, but possibly controllers.

Discovery clients 110-111, usually controllers.

And, optionally discovery servers 140.

These actors are networked via a network 120 or networks, such as network wiring (e.g., for an Ethernet or other local area network (LAN), a home phone line or power line network, a Firewire (IEEE 1394), universal serial bus (USB), or etc.), fiber optic cabling, wireless transceivers (e.g., for a Bluetooth, Wi-Fi (IEEE 801.11b), or other wireless data network) or the like. The network 120 can encompass a personal area network of devices carried by or worn on a person, a local area network of devices in a locale, or a wide area network (such as the Internet or other geographically dispersed data network).

The discovery clients 110-111 and responders 130-132 can be any variety of device with embedded computing and networking capabilities, including without limitation audio/video or other multimedia recording/transmitting/receiving/or presenting device (broadcast receivers, televisions, video players, cameras, etc.), computers (personal, workstation, server, handheld, laptop, tablet, or other mobile), telephones, office equipment (printers, copiers, scanners, fax), security systems, home appliances (lighting, heating, ventilation, air conditioning, door openers, kitchen appliances, etc.), as a few general examples.

The discovery clients 110-111 and responders 130-132 each implement the ad-hoc service discovery protocol. They include networking protocol stacks for communicating over the network 120 with other network actors. They also include network interfaces for interfacing with the network 120. In general, the network interfaces 150-153 are the physical or hardware interfaces to the networks, such as a network interface card (NIC) or adapter for physically interfacing with the network media. The devices also can include various logical interfaces provided over a physical network interface, such as a virtual private network (VPN), unicast, Point-To-Point Tunneling Protocol (PPTP) on a single NIC.

In one implementation, the ad-hoc service discovery protocol is based on XML Web Services of Microsoft Corporation, as described in, among others, Christensen et al., "Web Services Description Language (WSDL) 1.1," W3C Note 15 Mar. 2001; and R. Wolter, "XML Web Services Basics," Microsoft Corporation, December 2001. As such, the ad-hoc service discovery protocol also uses the networking protocol stack of Web Services, which also can serve the needs of discovery, control and eventing. This simplifies the implementation of devices in the network architecture 100. Further, the ad-hoc service discovery protocol can then reuse the security framework defined in Web Services Security (WS-Security), described in Atkinson et al., "Web Services Security (WS-Security), Version 1.0, April 2002, again simplifying device implementation.

Although illustrated as having a single discovery server 140, the environment 100 can include multiple discovery servers (e.g., discovery servers with divided responsibility over different scopes of discovery responders in the environment).

Ad-Hoc Service Discovery Protocol Overview

In one implementation, the ad-hoc service discovery protocol described herein provides transport-neutral mechanisms to locate devices and services. The ad-hoc service discovery protocol involves exchanges of four basic message types between discovery clients, discovery responders and discovery servers, including: find, find response, announce, and bye-bye.

The ad-hoc service discovery protocol can operate in two modes: either by sending a query (a find request message) to a multicast group, or by sending a query directly to a selected discovery server. In multicast mode, the devices whose device or service description matches the query return a response (a find response message) directly to the sender; in direct mode, the server provides a list of devices or services matching the query. The procedure by which clients discover servers and switch from multicast to server-based operation is called "multicast suppression."

Devices send an announcement (an announce message) when they enter a network; they may send a departure notice (a bye-bye message) when they are ready to leave a network.

Discovery responses may only return the essential characteristics of the devices and services, such as the service identifier and the address at which the service is reachable; other procedures can be used to obtain devices characteristics, such as by directly querying the device.

Common Formats

The ad-hoc service discovery protocol uses several Extensible Markup Language (XML) formats for its message exchanges. XML is described more fully in Bray et al., "Extensible Markup Language (XML) 1.0 (Second Edition)," W3C Recommendation, October 2000.

Common Header Blocks.

The ad-hoc service discovery protocol defines a small number of common SOAP-based header blocks that are common to some or all of the four message types. Simple Object Application Protocol (SOAP) is described in Box et al., "Simple Object Application Protocol (SOAP) 1.1," W3C Note 8 May 2000. These header blocks are used to provide basic message delivery and correlation functionality. Alternative implementations of the ad-hoc service discovery protocol need not use these message blocks.

MessageID.

This header block contains a uniform resource identifier (URI) that uniquely identifies this transmission unit. When retransmitting a message, the same URI must be used. It is defined in the. XML schema shown in FIG. 3C.

CorrelationID

This header block contains a URI that uniquely identifies the message that this transmission unit is a response or fault to. It is defined in the XML schema shown in FIG. 3C.

Idempotent.

This header block is always empty and its presence in a SOAP message indicates that the request may be treated as idempotent. It is defined in the XML schema shown in FIG. 3C.

TTL.

This header block contains a value (a 32-bit integer) that indicates the number of seconds that this transmission unit is to be considered viable. It is defined in the XML schema shown in FIG. 3C.

To.

This header block contains a URI that indicates the intended recipient of the message. It is defined in the XML schema shown in FIG. 3C.

ReplyTo.

This header block contains two elements both of which contain a URI. Presence of this header block indicates the intended recipient for any responses or faults for the current message. The contents of the "to" child element should be copied to the "To" SOAP header block of the response or fault message that is sent to the transport address specified by the "transportAddress" child element. It is defined in the XML schema shown in FIG. 3C.

WS-Policy Assertion Types

The ad-hoc service discovery protocol uses a Web Services policy assertion (WS-Policy) to express security and transport capabilities and requirements. (See, e.g., Box et al., "Web Services Policy Framework (WS-Policy)," Version 1.1, May 2003.) This section defines one policy assertion type to indicate the transport type and address of a service.

Address Policy Assertion.

This policy assertion type contains a URI that indicates the transport-specific address. The type of transport is derivable from the URI scheme of the address. This assertion is defined in the XML schema shown in FIG. 3D.

Devices and Services Description.

The purpose of the ad-hoc service discovery protocol is to let discovery clients discover services hosted by devices. The data model is thus device centric: a device hosts services, or possibly other devices; the find responses will carry a description of the device and of all the hosted services.

The key data structures in the model are the "ServiceEntry," used to describe services, and the "DeviceEntry," used to describe devices, which are defined in the XML schema shown in FIG. 3E-F. The "ServiceEntry" schema consists of the following strongly typed elements:

friendlyName: Friendly name of the service (or of the device), configNumber: An optional 32 bit unsigned integer representing the configuration sequence number that is incremented every time the service configuration is modified.

scopes: An optional list of scopes with which the service has been associated endpointInfo: Information needed to contact the service encapsulated in an instance of "EndpointInfo" schema type, which includes:

endpointID: Unique identity of the service, implementationType: Identifies the concrete implementation type of the service, typeInfo: List of WSDL 1.1 portTypes supported by the service, policy: A WS-Policy policy expression that conveys, among other things, the supported transports and security policy related to authentication, encryption, and integrity enforced by the service, An optional list of deployment-specific properties as an extensibility mechanism.

The "service type" key specified in the Find request can match the types specified in the "implementation Type" and "typeInfo" elements of the "endpointInfo" type.

The devices are described using a superset of the service description. In the XML schema, the DeviceEntry schema type extends the ServiceEntry schema type by adding three elements:

manufacturerName: Device manufacturer name serialNumber: Device serial number entries: An optional list of deviceEntry or serviceEntry elements representing contained devices or services.

The discovery server is described by a "DiscoveryServiceEntry" schema type (in FIG. 3E) that extends the "ServiceEntry" by adding the following element:

supportedScopes: list of scopes supported by the discovery server. In other words, clients can utilize this discovery server to search for services and devices that are associated with the scopes specified in the supported scopes. The "supportedScopes" is orthogonal to the "scopes" element of the "ServiceEntry" that indicates the scopes with which the discovery device itself is associated.

In addition, the discovery server supports the "DiscoveryServer" port type.

The XSD definition of the ServiceEntry, DeviceEntry and DiscoveryServiceEntry schemas are shown in FIG. 3E-F.

The configuration sequence number (configNumber) is used to enable controlled caching of device or service characteristics. When a device joins the network 120 (FIG. 1), its Announce message contains the device identifier (the endpointID field in the endpointInfo element), the configuration number, and the stateless boot time of the device; the recipients (e.g., discovery clients 110-111 and discovery server 140 (if present)) of the message can use the unique identifier to check the presence of a device description in their local cache, and the configuration number to check whether their copy is up to date; if the local cached value is up to date, they will not need to further contact the device. A configuration number may also be associated to a service hosted by a device; if a service configuration changes, then the configuration number of the hosting device must also change. If a contained service or device inherits properties from the containing device and these inherited properties change, then the configuration number of the contained service or device must also change. However the converse is not true; when a containing device's configuration number changes, the configuration of contained devices or services may be unchanged if their specific configuration is unchanged.

The scope information is used to control the scope of queries in large networks. It can be set by an explicit configuration of a device, or it can be associated to the device identifier in the database of a discovery server. A device may be present in multiple scopes. By default, UPNP services (and contained devices) are listed under the same scope as their hosting devices; however, it is possible to assign different scopes to individual services (and contained devices). The scope value is encoded as a URI, such as "http://example.com/loc/bldg2/floor1." Scopes defined using "http" URI are hierarchical and thus support prefix matching. In other words, a scope string in a Find message which is a prefix for a configured scope of a device/service should match. However the opposite is not true. For example if a device has a configured scope of "http://example.com/loc/bldg2/floor1," then a Find with scope of "http://example.com/loc/bldg2/" should match, but a Find with scope of "http://example.com/loc/bldg2/floor1/room32" should not match. If multiple scope URIs exist, then the scope URI specified by the Find can match any one of them using the rules outlined above. For example if a device has 2 scope strings "http://example.com/loc/bldg2/floor1" and "http://example.com/org/us/sales," and a Find is issued with "http://example.com/loc/bldg2/floor1," then the scopes should match. A device which has not been configured to have a particular scope should by default have a scope of "http://schemas.upnp.org/2003/01/discovery/adhoc." Discovery clients that do not specify any scope strings in the Find message will match only with devices with a scope string of "http://schemas.upnp.org/2003/01/discovery/scope/adhoc." Discovery clients that specify a scope string of "http://schemas.upnp.org/2003/01/discovery/scope/any" in the Find message will match with all scopes.

The "endpointInfo" element is used to describe the characteristics of a service or a device. It contains all of the parameters required to establish a connection to the service, such as transport addresses or security policy. The endpointID component of the endpointInfo is a unique identifier of the service; it is also used to identify the device when the service represents a device.

The implementationType element identifies the type of the service, a single URI that may identify the combination of a complex set of types. The complete list of types that can be used to access the service is provided in the typeInfo element.

The policy element that contains two or more types of policy assertions: transport policy assertions are the list of transport types over which the service can be reached, and for each transport the corresponding address. The transport data depends on the transport type, but is typically represented as a URL for most common IP transports such as TCP, HTTP, and SMTP. Security policy assertions document the supported authentication, encryption, and signature algorithms. Other assertions may be included to characterize other, service-specific requirements.

It is not necessary to document the transport policy and security policy for a service or device that is contained in another device, if the values are the same as those of the containing device, and if the endpoint reference of the containing device is included in the same message. In fact, the only required field in the EndpointInfo schema type is the endpointID field representing the identity of the service; the rest are optional. An EndpointInfo instance containing only the endpointID field can only be used for identity comparison and needs further resolution to be able to contact the service identified. The discovery "Find" message can be used to refine such a minimal EndpointInfo instance to specify the transport addresses over which it can be reached. In other words, all the EndpointInfo instances returned as part of the FindResponse message should minimally specify the endpoint identity and the transports fields. However, services and devices should include as much information as possible and permissible in the FindResponse message in the interest of efficiency. The elements published in the FindResponse message remain the same across multiple "Find" requests unless the config number has changed; some elements may be omitted from some responses, e.g. for security considerations. Once a transport address is known over which the identified service can be reached, the EndpointInfo instance can be further refined to the desired level by contacting the service directly.

Both the ServiceEntry and the EndpointInfo schema types contain an extensibility option.

The ServiceEntry and DeviceEntry schema types can also be extended by the definition of a more specific service or device data type. For example, it is possible to define a "PrinterCopierDeviceEntry" schema type as an extension to the base "DeviceEntry" schema type that adds "color", "supportedPaperSizes", and "supportedOrientations" fields. In addition to providing the benefits of strong typing, information specified in a schema can be queried more easily and readily using a filter expression (in XML Path Language (XPath) format as described in Clark et al., "XML Path Language (XPath) Version 1.0," W3C Recommendation 16 Nov. 1999).

FIG. 4 shows an example response of a complete description of a hypothetical printer-copier device; it contains the fields specified by a hypothetical printer-copier entry schema called "PrinterCopierDeviceEntry". This description describes a printer-copier device that aggregates printer and copier services of types XPrinter and XCopier respectively. The services are reachable on separate transport addresses that are different from the containing device, but share the same security policy as the containing device. The printercopier device is capable of printing and copying in color, supports A4 and Legal paper sizes, and supports Portrait and Landscape orientations.

Message Formats

The ad-hoc service discovery protocol uses four types of messages, implemented using SOAP; error reporting follows the SOAP specification. The "Find" message is used to start a query; the "FindResponse" message carries the responses to this query; the "Announce" message is sent by a discoverable entity when entering a network, and the "Bye-Bye" message may be sent by a device about to depart a network. All these messages refer to elements of the device and service description.

Find Message.

When discovery clients 110-111 (FIG. 1) want to discover objects on the network 130 (FIG. 1), they prepare a FIND request, send it, and wait for responses. In ad hoc mode, the find request is sent to a discovery multicast address (which may be an Internet Protocol version 4 (IPv4) or Internet Protocol version 6 (IPv6) address, or both). In server mode, the find request is sent to the URL of the discovery server 140 (FIG. 1).

The request has two parts: addressing and transport control elements encoded in the SOAP header, and a query specification sent in the body of the SOAP request. The key elements in the SOAP header are:

The endpoint URI to which the message is sent, which can be either the URI of the server, or a discovery URI, A unique identifier of the request, used for correlating requests and responses and for detecting duplicate requests, An optional "ReplyTo" value, identifying the endpoint at which the originator of the query expects to receive responses.

The query specification can contain:

An optional scope indication,

An optional "key" specification, providing a compact encoding of simple queries by specifying the well known property name, and a property value.

An optional "filter" specification, encoding a rich query using as a combination of XPATH values, An optional "findContext" specification, encoding the context associated with find request processing, An optional "sizeLimit" indication, An optional "pageContext" indication.

A scope parameter indicates that a discovery client is only interested in objects that belong to the specified scope.

The key specification is used for simple queries, in which the discovery client 110-111 is looking up a single property of the discovery responder 130-132, such as a service type or its identifier. The property is identified by a simple type. The discovery responders recognize the following three simple types defined in the schema shown in FIG. 3A:

Type: Its value specifies a service type

DeviceType: Its value specifies a device type

EndpointID: Its value specifies the unique identifier of a service/device

The desired property is expressed as a character string, which may represent either the value itself, or a prefix of that value.

A query can contain only one key specification. If a search on a combination of parameters is desired, the client should express the desired combination using the "filter" parameter. Simple discovery responders, such as simple discovery devices, may not be able to process complex filters; responders may consider a filter expression that they cannot fully evaluate as true, and return a response even if they are not sure that this response actually matches the query.

The query can be supplied with an optional context parameter called "findContext" that can be used for encoding application semantics such as supplying additional context to a filter specification, request-response correlation, etc. It is composed of two parts, both of which are typed as "xs:anyType". The first part called "filterContext" is used for query message processing. The second part called "callbackContext", if present, is not interpreted in the query message processing, but is emitted back as the "callbackContext" parameter into the response message. In other words, the "filterContext" is used in the query request processing and the "callbackContext" is used in the query response processing.

If a query does not contain a key specification or a filter specification, it will return all-objects in the specified scope. If a query that does not contain a scope specification, it will apply only to those objects that have either not been configured with a scope value or have been explicitly configured as belonging to the "/adhoc", scope.

When the discovery client 110-111 is sending the find request to a discovery server 140, the discovery server may sometimes find a very large number of matching entries in its database. There will be cases in which either a discovery client or a discovery server wants to limit the number of entries that will be returned in a response. A discovery client requests only the first N objects matching its Find criteria by setting the value of the optional sizeLimit element of its Find request. A discovery server will report the non completion of the query in the status element of the Find Response, as explained in the discussion of the find response message below.

In other cases, a discovery client is interested in more entries than a typical FindResponse will allow or that the discovery client is willing to process at once; the complete set of entries will be retrieved by a cycle of Find requests and Find Response. To support this scenario, a discovery client may request paged results when it directs a Find request to a directory server by including a pageContext element in the Find message:

The first Find request will carry an empty pageContext element,

The subsequent Find requests will carry a pageContext element copied from the last FindResponse;

The client must specify a value for sizeLimit when supplying a pageContext; the subsequent Find request must carry the same filter, key and scope parameters as the first one.

The cycle will terminates when the client receives a FindResponse in which the pageContext element is empty; a non empty pageContext indicates that more pages are available. If more pages are available but the discovery client is not interested in retrieving them, the client should send a Find request with the original parameters, sizeLimit="0", and the pageContext from the last FindResponse in the sequence; this allows the directory server to immediately free any resources it might be consuming that would allow retrieval of the next page of results.

FIG. 5 shows an example of a find request that is sent to the multicast channel:

Because sending lengthy find messages over multicast is inefficient, and prone to failure, senders in multicast mode preferably keep the message size under 1400 bytes, which is a practical payload limit on common local area networks.

Find Response Message.

In ad hoc mode, a discovery responder 130-132 (FIG. 1) that receives a query sends a response if the query matches one of the locally available services. In server mode, the discovery server 140 (FIG. 1) returns a response containing a list of the objects that match the service. The query response is encoded as a SOAP message, which is sent to the "ReplyTo" endpoint specified in the query if one was specified, and to the originator itself otherwise. The response is sent over a reliable protocol (e.g., TCP), even if the query was received via UDP.

The find response message has two parts: addressing and transport control elements are encoded in the SOAP header, and the response data is sent in the body of the SOAP request. The key elements in the SOAP header are:

The endpoint URI to which the message is sent, copied from the "to" element of the "ReplyTo" SOAP header component of the query's header, A unique identifier of the response, A correlation element that repeats the identification of the query, The response body contains:

A list of entries describing the discovered objects, following the ServiceEntry schema used to represent a service and "DeviceEntry" schema type used to represent a device, The optional callbackContext if it was specified in the Find request, An optional status element, An optional pageContext element, The status element provides information when a Find request has been processed, but the processing was not successful. The status schema consists of the following elements:

details: contains a machine-interpretable payload and is specified to be of "anyType"

description: an optional element that contains additional human-readable information about the failure.

The pageContext element is present when the client included a pageContext in the Find request, and is used to enable "continuation requests" as explained in the discussion of the find message above. The pageContext content returned with a given FindResponse must be passed back to the discovery server (along with the original parameters, including the filter, scope, etc.) on the next Find in order for the client to receive the next sizeLimit objects in the result set. The pageContext may change from page to page of a given sequence of Find-FindResponse messages, and the discovery client may send the pageContext from only the most recent FindResponse in the sequence in its next Find request. Specifying a previous pageContext value may yield a failure status with <details xsi:type="disc:InvalidPageContext"/> child. If the pageContext in the most recent FindResponse is empty, that FindResponse holds the last objects in the result set.

In this implementation, a FindResponse with a pageContext never includes a status element with <details xsi:type="disc:SizeLimitExceeded"/> child.

FIG. 6 shows an example response illustrating the typical information received in response to the Find request shown above. Since the request is for a printer type, the response data contains the fields specified by an example printer-copier entry schema called "PrinterCopierDeviceEntry" shown in FIG. 4.

The above response indicates a printer-copier device that aggregates printer and copier services of types XPrinter and XCopier respectively. The services are reachable on separate transport addresses that are different from their containing device, but share the same security policy as their containing device. The printer-copier device is capable of printing and copying in color, supports A4 and Legal paper sizes, and supports Portrait and Landscape orientations.

Announce Message.

The announce message is sent by a discovery responder 130-132 upon entering a network. In the absence of explicit configuration, the message is sent to the same multicast address as queries. In some environments, devices and controllers can be configured to send this message at the specific address of a discovery server, denoted by a discovery server's URL. Only the root device of the discovery responder 130-132 (not its hosted services) sends the announce message when it enters the network. More precisely, it is not necessary to announce the devices/services aggregated by the root device unless there is an explicit reason to do so such as a configuration change in the aggregated device/service.

The announce message has two parts: addressing and transport control elements encoded in the SOAP header, and an announcement data sent in the body of the SOAP request. The key elements in the SOAP header are:

The endpoint URI to which the message is sent, which can be either the URI of the server, or a conventional discovery URI for multicast transmission, The "contact" URI to which discovery clients can send direct queries, A unique identifier of the request, The announce body contains the unique identifier of the discovery responder, its configuration number, and the value of the statelessBootTime for the device:

The unique identifier is set to the value of the endpointID field in the endpointInfo element of the service/device entry;

The configuration number is set to the value of the configNumber element of the service/device entry;

Discovery servers 140 and discovery clients 110-111 utilize the unique identifier and configuration number of the discovery responder to check if they have the latest information about this service/device. If not, they may issue a unicast Find request with the key specification indicating a lookup for a specific endpoint id, and the looked up key value is set to the unique identifier of the discovery responder. The service will respond to the Find request by supplying its configuration as explained in the FindResponse section above.

The "StatelessBootTime" represents the stateless boot time of the service/device. In one implementation, the stateless boot time is a value expressed according to a monotonically increasing clock, and encoded as a 32 bit integer. This field is used to detect the case when a service/device has gone down and come back up again and can be used by clients for features such as reestablishing desired event subscriptions. A convenient mechanism is to set this field to the boot time of the device, expressed as seconds elapsed since midnight Jan. 1, 1970; for devices that have a notion of time, this will not require any additional state to remember or be "flashed." However, it is perfectly acceptable for a service to reuse a simple boot counter that is incremented on every stateless boot as a value of this field if such a boot counter is needed for its functionality. As such, the discovery clients should not view this field as a timestamp. The service should not change this field value when it goes down and comes back up without loss of state.

FIG. 7 shows an example of an announcement message.

ByeBye Message.

The ByeBye message is sent by a discovery responder 130-132 (FIG. 1) when it is ready to depart the network 120. In the absence of explicit configuration, the message is sent to the same multicast address as queries. In some environments, devices and controllers can be configured to send this message at the specific address of a discovery server, denoted by a server's URL.

The response has two parts: addressing and transport control elements encoded in the SOAP header, and an announcement data sent in the body of the SOAP request. The key elements in the SOAP header are:

The endpoint URI to which the message is sent, which can be either the URI of the server, or a conventional discovery URI for multicast transmission, A unique identifier of the request, The response body contains the unique identifier of the discovery responder, and the same stateless boot time that was sent in the corresponding announce message.

FIG. 8 shows an example of a ByeBye message.

Roles and Behavior

The WSDL specification in FIG. 2 and the XML Schema specification in FIG. 3 capture the message format and the specification of the various operations. In this section, the behavior of the systems involved in discovery is defined, such as the use of configuration information, multicast and unicast transmission, and the use of timers.

In one implementation, the ad-hoc service discovery protocol uses the following parameters (alternative implementations can vary these parameters):

PORT: a port number to be allocated by the IANA for the operation of the ad-hoc service discovery protocol.

Discovery IPv4 URL: soap.udp://239.255.255.250:PORT/

Discovery IPv6 URL: soap.udp://[FF02::C]:PORT/ (link scope)

System Discovery URL: the URL at which a given system waits for discovery messages. This URL is normally bound to a TCP based SOAP transport, i.e. HTTP or TCP. By default, the URL is set to http://<name>:PORT/, where <name> is the name of the local system.

Discovery URI: The conventional discovery URI identifying the entity to which discovery messages are destined carried as part of <disc:To>SOAP header block. This URI in combination with the above discovery URLs (transport addresses) identifies the discovery endpoint. This URI is fixed by convention to be http://schemas.up-np.org/2003/01/discovery/discovery-uri.

Discovery spreading timer: a timer used to delay some actions by a random interval, set by default to 1 second.

Discovery query timer: a timer used when waiting for responses, set by default to 2 seconds.

Configured discovery server URL: the URL of a discovery server, as explicitly configured in a responder or a client.

Discovered discovery server URL: the URL of a discovery server, as dynamically discovered by a discovery client.

Discovery Max-Hops: the number of links that can be spanned by a multicast message, or by a message sent in response to a multicast message. The value is fixed to 1.

Behavior of Discovery Responders.

Discovery responders 130-132 (FIG. 1) are engaged in three types of operation: they announce their presence when they enter a network, they respond to discovery requests, and they send a ByeBye message when they depart a network. The behavior of these systems may be affected by the configuration of a discovery server.

Configuration of a Discovery Server in a Discovery Responder.

Discovery responders may be configured to use a discovery server either through explicit configuration, or, by using a DHCP "discovery server option." In the presence of both a DHCP option and a configured value, the discovery responder uses the configured value.

Discovery responders that also behave as discovery clients may obtain a "discovered discovery server" URL. The presence or absence of this URL will not affect the behavior of the responder, i.e. the sending of Announce and ByeBye messages or the processing of discovery requests.

Sending Announce Messages.

The discovery responders 130-132 send an announce message upon entering the network 120. The "entering of a network" event may be detected through low level mechanisms, such as wireless beacons, or through a change in IP connectivity. The discovery responders also send an announce message if their configuration changes, i.e. if the last announce message they sent carried a different configNumber than the current value. The discovery responders may or may not need to send an Announce message following a change in IP address: if they followed recommended practice, their description only includes host names in the URL, not IP addresses, and a change in IP address thus does not result in a change of the configuration. However, in some cases, a change in IP address may be indicative of the device entering a new network, which warrants an Announce message.

Discovery responders 130-132 wait for a timer between detecting this event and sending the announce message. This timer will be set to a random value picked between 0 and a configured value T; by default, T is set to 1 second.

If the discovery responder has been configured to use a discovery server 140, the responder-will send the announce message to the configured URL of the server, normally using a TCP based transport. If the responder has not been configured to use a discovery server, the announce message will be sent using SOAP.UDP to the discovery IPv4 URL, if it is IPv4 capable, and to discovery IPv6 URL, if it is IPv6 capable. A dual stack responder will send the announce message over both IPv4 and IPv6. When sending a SOAP.UDP message over IPv4, the discovery responders set the IP TTL value to the discovery. Max-Hops value, in order to limit propagation of the message.

Responders may repeat an announce message up to N=4 times, using exponentially increasing random timers between each retransmission. If the discovery server is configured, the system should stop retransmission as soon as it knows that a transmission has been successful.

FIG. 9 shows a procedure (represented in pseudo-code form) used in the discovery responder to send an announcement message.

The repeated messages should specify the same <disc:MessageID>SOAP header block so as to support detection of duplicate messages, as discussed in the section on elimination of duplicate messages below.

In secure environments, the discovery responders 130-132 can authenticate announce messages by inserting WS security extensions in the SOAP headers. Since announce messages can be used in replay attacks, the WS security extensions include appropriate "anti replay" protections.

Processing of Discovery Queries.

The discovery responders 130-132 (FIG. 1) wait for incoming discovery queries (find messages). The URL at which they wait for these queries depend upon their state of configuration:

Regardless of their configuration state, all discovery responders wait for find messages at their System Discovery URL.

Responders that are not explicitly configured with a discovery server address wait for find messages at the discovery IPv4 URL if they are IPv4 capable, at the discovery IPv6 URL if they are IPv6 capable, and at both addresses if they are dual-stack.

Discovery responders that also behave as discovery clients may have discovered a discovery server URL by means other than configuration; this discovery will not affect their behavior.

In order to avoid duplicate responses, the discovery responders should maintain a list of "already processed" find messages, as discussed in the section on elimination of duplicate messages below.

The discovery responders process find messages as follows:

1. If the find message is received through the discovery IPv4 URL or the discovery IPv6 URL, determine whether this is a new find message or a duplicate, as discussed in the section on elimination of duplicate messages below; if a duplicate, ignore the find message.
2. If secure operation is requested, check that the credentials specified in the find message are valid; if this is not the case, ignore the find message.
3. Determine the return address from the <disc:ReplyTo> header block, as specified in section on specification of the contact address below.
4. Check that the return address is compatible with security parameters (see below). If this is not the case, ignore the find message.
5. Determine whether the local device or a local service matches the find message.
6. If there is no match, stop further processing of the find message, if it was received through the discovery IPv4 URL or the discovery IPv6 URL after adding the find message identifier to the list of already processed messages; prepare an empty find response if it was received through the local System Discovery URL.
7. If the find message was not received through the local System Discovery URL, wait for a random time interval, picked at random between 0 and the standard discovery spreading timer.
8. Send the find response to the return address.
9. If the transmission of the find response was successful, add the find message identifier to the list of already processed find messages.

The duplicate determination in step 1 relies on the MessageID parameter of the SOAP header block. If this identifier is not present in the SOAP header, the find message will not be considered a duplicate; even if a find response is sent, step 9 will not be performed. If the identifier is present, the responder will test for duplicate as discussed in the section on elimination of duplicate messages below.

Step 2, secure operation, is requested when some of the responder's information is considered protected. Credentials, if present, are carried out using the "web service security" (WS-Security) extensions (discussed above) in the SOAP header.

The contact information mentioned in step 3 is encoded in the <disc:ReplyTo>SOAP header block. If this element is absent, the contact address will be set according to the rules specified in the section on Specification of the Contact Address below.

The return address checks in step 4 helps to prevent use of ad-hoc service discovery protocol for mounting denial of service attacks against third parties. The checks may be bypassed if the source has been identified as trusted during step 3. If the source has not been identified as trusted, the following checks should apply:

The IP address at which the find response is sent must be the same address as the source address of the find message;

If the find message was not received over a TCP based transport, e.g. if was received through the SOAP.UDP UPNP discovery IPv4 URL or the UPNP discovery IPv6 URL, then the IP address should belong to the local link.

If these conditions are not verified, the find message should be ignored. We should note that testing that an address "belongs to the local link" is not always possible; it is easy to do when the address has a limited scope (e.g. IPv6 site local address) but may be harder in the case of IPv4 or IPv6 global addresses. When the test cannot be performed, the responder may decide to proceed with the find message if it can assure that the find response will not be propagated more than the allowed number of hops, e.g. by setting the IP TTL to the discovery Max-Hops value for the response connection.

The procedure described above can be varied as a local implementation decision. For example, step 5, which determines whether there is a find response to be sent, can be performed immediately, so a device minimizes the amount of resources consumed by find messages to which it will not respond.

Sending ByeBye Messages.

The discovery responders 130-132 may send a ByeBye message upon departing the network 120, e.g. in a "polite shutdown" procedure.

If the discovery responder has been configured to use a discovery server, the responder will send the ByeBye message to the configured URL of the sender, normally using a TCP based transport. If the responder has not been configured to use a discovery server, the ByeBye message will be sent using SOAP.UDP to the discovery IPv4 URL, if it is IPv4 capable, and to discovery IPv6 URL, if it is IPv6 capable; a dual stack responder sends the ByeBye message over both IPv4 and IPv6. When sending a SOAP.UDP message over IPv4, the discovery responders set the TTL of the IP packet to the UPNP discovery Max-Hops value, in order to limit propagation of the message.

Discovery responders may repeat the ByeBye message up to N=4 times waiting a random amount of interval between 1 to 2 seconds between consecutive messages so as to improve reception of the ByeBye message in a multicast environment. All of the repeated ByeBye messages should specify same <disc:MessageID>SOAP header block, in order to enable receivers to eliminate duplicate messages, as discussed in the section on elimination of duplicate messages below.

Discovery responders are by no means required to repeat the ByeBye message 4 times. In fact, they are not even required to send a single message.

Behavior of Discovery Clients.

Discovery clients 110-111 (FIG. 1) perform discovery of devices and services by issuing find requests and waiting for find responses. They may also listen to Announce and ByeBye messages from responders. The behavior of these systems may be affected by the configuration of, or the discovery of, a discovery server.

Configuration in a Discovery Client of a Discovery Server.

Discovery clients 110-111 may be configured to use a discovery server through explicit configuration or by using the DHCP "discovery server option." In the presence of both a DHCP option and a configured value, the discovery client shall use the configured value.

Discovery of a Discovery Server

Discovery clients 110-111 (FIG. 1) that have not been configured to use a discovery server may discover a server by using the ad-hoc service discovery protocol. In this case, the use of the discovered server is optional: the discovery clients may weight the risks of the "spoofed server" attack against the practicality of using the server. In practice, the discovery clients should only use a discovered discovery server if the find response from the discovery server was properly authenticated.

Discovery clients may also discover a discovery server by receiving an announce message from a discovery server. Again, the discovery clients should only use this information if the announce message is properly authenticated, or if it can be confirmed by the properly authenticate response to a find message.

Sending Queries and Waiting for Responses.

When a discovery client wants to find devices or services on a local network, the discovery client prepares and sends a find message and then waits for find responses. The body of the find message documents the query. The SOAP header may document a number of extensions:

WS security extensions for authenticating the message,
Message identifier encoded as the <disc:MessageID>SOAP header block,
Time to live of the query encoded in the <disc:TTL>SOAP header block,
Contact address in the <disc:ReplyTo> element of the SOAP header.

The discovery client will use these extensions when appropriate, i.e. when operating in secure mode (under WS security), when sending message over an unreliable transport such as SOAP.UDP (message identifier), or when a default time to live (TTL) of 30 second is too long (time to live). If the client does not specify a contact address, it should be ready to receive responses at default local system discovery URL, constructed as "http://<source>:PORT/, where <source> is the IP address of the client and PORT is the Discovery port.

If a discovery server has been explicitly configured, the discovery client sends find messages to that discovery server. If the transmission of the find message fails, the discovery client considers that the discovery service is unavailable.

If a discovery server has been dynamically discovered, the discovery client tries to send find messages to that discovery server. If the transmission of the find message fails, the discovery client may either try to discover another discovery server and transmit the find message to that alternate server, or it may fall back to the ad hoc operation.

If no discovery server has been configured or discovered, or if the discovered discovery server is not available, the discovery client sends (multicasts) a copy of the find message using SOAP.UDP to the discovery IPv4 URL, if it is IPv4 capable, and to the discovery IPv6 URL, if it is IPv6 capable; dual stack clients will send the find message over both IPv4 and IPv6. When sending a SOAP.UDP message over IPv4, the discovery client sets the IP TTL to the Discovery Max-Hops value, in order to limit propagation of the message.

After sending the find message, the discovery client waits for find responses. Find responses arrive at the specified URL in the find message. If the client has issued multiple simultaneous find messages, it will use the <disc:CorrelationID>SOAP header block of incoming find responses to correlate these find responses with the original find messages.

If the find message was sent to a discovery server, the discovery process will complete after either:

The arrival of a find response from the server;
Or the elapsing of the discovery find timer, which indicates a failure of the discovery server.

If the find message was sent to a multicast address, the discovery client may receive several find responses, from multiple discovery responders. The discovery client does not know in advance how many systems will respond, and can adopt one of the two following behaviors:

It may just wait for a sufficient number of find responses,
Or it may decide to repeat the find message several times, until it is convinced that no further find responses will be received.

If the discovery client decides to repeat the find message several times, it should use the same message identifier in all copies of the find message, and wait an interval at least equal to the discovery find timer between two repetitions.

Processing of Announce and ByeBye Messages

Discovery clients 110-111 may monitor Announce and ByeBye messages to maintain a list of the devices and services available on the network 120 by listening to the discovery IPv4 URL, if they are IPv4 capable, and to discovery IPv6 URL, if they are IPv6 capable; dual stack discovery clients monitor both addresses.

Discovery clients should be aware of the possible attacks by spoofed Announce or ByeBye messages, or by replayed Announce or ByeBye message, and implement mitigations. In particular, the following precaution is applied if a discovery client decides to contact the device/service, for example to query its properties, after receiving an announce message:

If the announce message was not received through a TCP based transport, wait for a random time interval picked at random between 0 and the standard UPNP discovery spreading timer before contacting the device;
If the IP address at which the device will be contacted was deduced from a data element in the announce message, check that this IP address is trusted.

The definition of a trusted address is the same as the definition used by responders responding to find messages. If the announce was not properly authenticated and did not come from a trusted source, then: the IP address contacted must be the same address as the source address of the announce message; and the IP address must belong to the local link. If the client cannot easily determine whether the address belong to a local link, it must assure that the contact message will not be propagated outside of the local link, e.g. by setting the IPv4 TTL or the IPv6 max-Hops parameter to the Discovery Max-Hops value for the connection over which the contact message is sent.

Behavior of Discovery Servers.

The primary role of discovery servers 140 (FIG. 1) is to respond to queries issued by discovery clients 110-111 (FIG. 1). The discovery servers maintain a database of discovered devices that are present on the network 120, by a combination of:

Listening to Announce and ByeBye messages,
Issuing find messages to discover devices and services present in the local network 120,
And possibly other means (e.g., explicit configuration, directory service or other discovery protocol).

Response to Discovery Queries

The discovery servers 140 wait for queries on:

The System Discovery URL used by for the service,
The discovery IPv4 URL if they are IPv4 capable, at the discovery IPv6 URL if they are IPv6 capable, and at both addresses if they are dual-stack.

The processing of find messages by discovery servers is similar to the processing of find messages by discovery responders, with two important differences:

If the discovery server receives a find message through the discovery IPv4 URL or the discovery IPv6 URL (i.e., through multicast), the discovery server should respond to the find message if the find message matches the description of itself i.e. the discovery service; the discovery server may respond to other find messages with a description of the discovery service, even if the find message is for another type of service.

If the discovery server receives a find message through the local System Discovery URL, the server will respond with a list of entries that are present in the server's database and match the find message.

The purpose of the first rule is to allow dynamic discovery of the server. The second rule describes the essential difference between a server and a responder. In secure environments, the list of entries will only contain the information whose access can be authorized, based on the credentials present in the find message.

Using SOAP

The ad-hoc service discovery protocol is executed by the exchange of SOAP messages, following the specification of SOAP, which is described in Box et al., "Simple Object Application Protocol (SOAP) 1.1," W3C Note 08 May 2000. The following sections discuss how discovery clients, responders and servers are use SOAP. Specifically, the use of SOAP bindings to the HTTP and SOAP.UDP transports, the default URL used by the service, the use of UPnP-specific SOAP header blocks to eliminate duplicate messages and specify a reply URI, and the use of WS-Security extensions to authenticate and possibly encrypt messages is discussed.

SOAP Bindings

SOAP messages may be carried over different types of transport. The W3C has so far specified two bindings of SOAP Version 1.2: SOAP over HTTP (described in Gudgin et al., "SOAP Version 1.2 Part 2: Adjuncts," W3C Proposed Recommendation 07 May 2003) and SOAP over email. Discovery clients, responders and servers implement the SOAP HTTP Binding and "conform to the SOAP 1.2 HTTP Binding." Discovery clients, responders and servers may implement other SOAP bindings as these bindings get standardized.

In the ad-hoc service discovery protocol, some messages are sent over UDP multicast. There is not yet a standard binding of SOAP over UDP. The above discussion defines the SOAP.UDP scheme used in this binding. This scheme will only be used for the transmission of multicast messages; not for "unicast" transmission of SOAP messages to a specific host.

The SOAP.UDP Binding

The SOAP.UDP binding is minimally defined by specifying the SOAP.UDP packet format, the SOAP.UDP URL format, and the SOAP.UDP transmission rules.

SOAP.UDP Packet Format

When using the SOAP.UDP binding, a SOAP message is transmitted by sending the XML encoded SOAP message in the payload of a UDP datagram; the XML text is encoded using UTF-8. There are no intermediate data between the UDP header and the first character of the XML text.

SOAP.UDP URL Format

The URL at which SOAP.UDP messages are sent is encoded according to the following minimal syntax:

SoapUdpUrl="soap.udp:" "//" Host ":" Port
Host=ipv4-address |"[" ipv6-address "]"
Port=1*5 Digit The IPv4 address, if present, is encoded according to the "quad dot" notation, e.g. 127.0.0.1.

The IPv6 address, if present, is encoded according to the textual representation of IPv6 addresses specified in RFC 2373, e.g. 2001:234::5678:90AB:CEDF. The encapsulation of this address between square brackets is in conformance with RFC 2732.

SOAP.UDP Transmission Rules

Discovery clients, responders and servers transmit SOAP.UDP by sending the message text as the payload of a UDP datagram. The IP and UDP header are constructed as follows:

Choice of IP version: IPv4 or IPv6, depending of the address specified in the SOAP.UDP URL.

IP Source address: appropriate IPv4 or IPv6 address of the sender.

Destination address: the IPv4 or IPv6 address encoded in the SOAP.UDP URL.

Source UDP port: a port chosen by the sender.

Destination UDP port: the port number specified in the SOAP.UDP URL.

UDP payload length: the length in bytes of the XML encoding

The use of an IP source address and source UDP port in a SOAP.UDP message does not imply that the sender is ready to receive SOAP UDP messages at that same address and port. All responses to a SOAP.UDP message are sent, by default, to an HTTP URL, using a regular HTTP over TCP transport.

Elimination of Duplicate Messages

For reliability, messages transmitted over SOAP.UDP may be repeated, which often leads to duplicate reception. Duplicate reception may also result from the transmission of the same message through multiple channels, e.g. over IPv4 and over IPv6. It is important for discovery agents (i.e., discovery clients, discovery responders and discovery servers) to recognize duplicate messages as such, in order to as much as possible avoid duplicate processing and duplicate transmission of responses.

In order to avoid duplicate responses, the discovery agents maintain a list of "already processed" SOAP messages. Each entry in the list indicates a message identifier (MessageID) and a time to live (TTL); the entries are removed if the time to live has expired. The message identifier is encoded in the <disc:MessageID>SOAP header block as a URI. By default, the time to live of an entry is set to 30 seconds; alternative value may be specified on a per message basis using the <disc:TTL>SOAP header block; receivers may however decide to cap the value at some preset maximum, in order to avoid having to keep trace of any message for too long.

The list is managed as follows:

A new entry is added to the list after successfully processing a message that was received on an unreliable transport, i.e. SOAP.UDP.

The list is consulted each time a message is received through the unreliable transport, SOAP.UDP; if the message identifier is already present in the list, the message is discarded without any further processing.

Entries are removed from the list when their time to live expires.

Systems preferably implement the list of already processed messages carefully; such as by using list management techniques to discard old entries if the size of the list exceeds the locally defined capacity.

Specification of the Contact Address

There are at least two cases when the sender of a discovery message expects to be contacted by the recipient: after sending a find message, the discovery client expects to receive find response messages from the responders; after sending an Announce message, a discovery responder may expect to receive find messages from discovery clients. The <disc:ReplyTo>SOAP header block can be used to encode the URL at which the sender of the find message expects to be contacted.

When the <disc:ReplyTo> header block is absent, the receivers of the message will contact the sender at the default system discovery URL, constructed as "http://<source>:PORT/", where <source> is the IP address of the client and PORT is the Discovery port.

Computing Device Structure

The above described ad-hoc service discovery protocol in the network architecture 100 (FIG. 1) can be performed on any of a variety of networked computing devices, including audio/video or other multimedia recording/transmitting/receiving/or presenting devices (broadcast receivers, televisions, video players, cameras, etc.), computers (personal, workstation, server, handheld, laptop, tablet, or other mobile), telephones, office equipment (printers, copiers, scanners, fax), security systems, home appliances (lighting, heating, ventilation, air conditioning, door openers, kitchen appliances, etc.), as a few general examples. The ad-hoc service discovery protocol can be implemented in hardware circuitry, as well as in software 880 of a device connectivity protocol (e.g., UPNP) executing within a computer or other computing environment, such as shown in FIG. 10.

FIG. 10 illustrates a generalized example of a suitable computing environment 800 in which the described techniques can be implemented. The computing environment 800 is not intended to suggest any limitation as to scope of use or functionality of the invention, as the present invention may be implemented in diverse general-purpose or special-purpose computing environments.

With reference to FIG. 10, the computing environment 800 includes at least one processing unit 810 and memory 820. In FIG. 8, this most basic configuration 830 is included within a dashed line. The processing unit 810 executes computer-executable instructions and may be a real or a virtual processor. In a multi-processing system, multiple processing units execute computer-executable instructions to increase processing power. The memory 820 may be volatile memory (e.g., registers, cache, RAM), non-volatile memory (e.g., ROM, EEPROM, flash memory, etc.), or some combination of the two. The memory 820 stores software 880 implementing the device connectivity protocol, including the ad-hoc service discovery protocol.

A computing environment may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The storage 840 may be removable or non-removable, and includes magnetic disks, magnetic tapes or cassettes, CD-ROMs, CD-RWs, DVDs, or any other medium which can be used to store information and which can be accessed within the computing environment 800. The storage 840 stores instructions for the device connectivity software 880, including the ad-hoc service discovery protocol.

The input device(s) 850 (e.g., for devices operating as a control point in the device connectivity architecture 100) may be a touch input device such as a keyboard, mouse, pen, or trackball, a voice input device, a scanning device, or another device that provides input to the computing environment 800. For audio, the input device(s) 850 may be a sound card or similar device that accepts audio input in analog or digital form, or a CD-ROM reader that provides audio samples to the computing environment. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The ad-hoc service discovery protocol can be described in the general context of computer-readable media. Computer-readable media are any available media that can be accessed within a computing environment. By way of example, and not limitation, with the computing environment 800, computer-readable media include memory 820, storage 840, and combinations of any of the above.

The techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

We claim:

1. A method of reliably discovering devices and services with ad-hoc and server-based operation in a network environment of devices acting as discovery clients and discovery responders, the discovery responders each providing one or more services, at least some of the services being non-unique to a particular device, the method comprising:

detecting by a device operating as a discovery client whether a discovery server is present;

in a detected absence of any discovery server by said device, conducting discovery of services of discovery responders by said device operating as the discovery client as a multicast operation;

in a detected presence of any discovery server by said device, said device switching to a server-based discovery mode of operation in which said device operates by:

suppressing by said device when operating as the discovery client of its multicast operation and conducting discovery of services of discovery responders by said device when operating as the discovery client directed to the detected discovery server; and continuing by said device when operating as one of the discovery responders to respond to multicast discovery only of said device's own services regardless of the presence or absence of the discovery server in the network environment.

2. The method of claim 1, wherein the detecting comprises sending by the discovery client of a discovery query as a multicast operation to find any discovery server in the network environment.

3. A method of reliable multicast suppression in service discovery on ad-hoc networks, comprising:
sending a multicast discovery query for discovery servers by a device acting as a discovery client on a network to find any discovery server present within a scope on the network;
receiving by said device acting as the discovery client any response to the multicast discovery query;
upon receiving a response of a discovery server to the multicast discovery query, said device switching to a server-based discovery mode of operation in which said device operates by suppressing sending further multicast discovery queries for device services by said device and sending further discovery queries for device services by said device directly to the discovery server, while the discovery server remains present on the network; and
in absence of any response to the multicast discovery query, sending the any further discovery queries for device services by the discovery client as multicast discovery queries on the network;
wherein said device when operating as a discovery responder when in the server-based discovery mode of operation continues to respond to multicast discovery queries only for device services matching said device's own services from another discovery client irrespective of the discovery server being present on the network.

4. A computing device operating as a discovery client in a network architecture for a discovery protocol capable of ad-hoc and server-based operation, the computing device comprising:
a memory storing software programming for an ad-hoc discovery protocol; and
a processor operating to execute the software programming in the memory;
wherein the software programming comprises:
programming code for switching the discovery client between server-based and ad-hoc discovery modes when a discovery server is determined to be present or absent, respectively, in a network in which the computing device is operating;
server-based discovery mode programming code for sending discovery queries of the discovery client for device services directly to the discovery server determined to be present in the network, while suppressing sending discovery queries via multicast transmission; and
ad-hoc discovery mode programming code for sending discovery queries of the discovery client for device services as a multicast transmission to discovery responders in the network; and
said server-based discovery mode programming code further configured to respond to the multicast transmission of the discovery queries by another discovery client for device services of the computing device only while the discovery server is determined to be present in the network.

5. The computing device of claim 4, wherein the software programming further comprises programming code for detecting the presence or absence of a discovery server in the network.

6. The computing device of claim 5, wherein the programming code for detecting comprises programming code for sending a multicast discovery query to find discovery servers present in the network.

7. A computer-readable storage media having computer-readable software programming thereon for executing on a discovery client in a network architecture of a discovery protocol capable of server-based and ad-hoc discovery, the software programming comprising:
programming code for switching the discovery client between server-based and ad-hoc discovery modes when a discovery server is determined to be present or absent, respectively, in a network in which the computing device is operating;
server-based discovery mode programming code for sending discovery queries of the discovery client for device services directly to the discovery server determined to be present in the network and otherwise suppressing sending any discovery queries via multicast transmission; and
ad-hoc discovery mode programming code for sending discovery queries of the discovery client for device services as a multicast transmission to discovery responders in the network;
said server-based discovery mode programming code further configured to respond to the multicast transmission of the discovery queries by another discovery client for device services of the discovery client only while the discovery server is determined to be present in the network.

8. The computer-readable storage media of claim 7, wherein the software programming further comprises programming code for detecting the presence or absence of a discovery server in the network.

9. The computer-readable storage media of claim 8, wherein the programming code for detecting comprises programming code for sending a multicast discovery query to find discovery servers present in the network.

10. A distributed system of networked computing devices compliant with an ad-hoc service discovery protocol, the distributed system comprising:
at least one networked computing device operating as a discovery client according to a network architecture of the ad-hoc service discovery protocol, the discovery client having a server-based discovery mode and an ad-hoc discovery mode, the discovery client operating to determine whether any discovery server is present or absent in a network and switch to the server-based discovery mode or ad-hoc discovery mode, respectively, according to the determination, the discovery client operating in ad-hoc discovery mode to send discovery queries for device services as multicast transmissions and operating in server-based discovery mode to suppress multicast transmission of discovery queries for device services by the discovery client; and
at least one networked computing device operating as a discovery responder with device services according to the network architecture of the ad-hoc service discovery protocol, the discovery responder operating regardless of said discovery responder having detected the presence of a discovery server in the network to respond to multicast transmissions of discovery queries only for device services matching the device services of the discovery responder itself.

11. The distributed system of claim 10 wherein the discovery client has a configured mode, the discovery client operating in the configured mode to suppress multicast transmission of discovery queries by the discovery client and send such discovery queries directly to a specified discovery server specified in its configuration.

12. The distributed system of claim 10 wherein the discovery responder has a configured mode, the discovery responder operating in the configured mode to suppress response to multicast transmission of discovery queries.

13. A method of discovering controllable device services in ad-hoc and server-managed networks of computing devices, the method comprising:
    when connected in an ad-hoc network, sending discovery queries for device services as a multicast transmission from a discovery client computing device;
    when connected in a server-managed network having a discovery server, sending discovery queries for the device services from the discovery client computing device as a directed transmission to the discovery server using a networking protocol that guarantees message delivery while suppressing sending any discovery queries via multicast transmission; and
    responding by the discovery client computing device to only those discovery queries for the device services received as multicast transmissions by the discovery client computing device that match device services of the discovery client computing device when the discovery client computing device is connected in a server-managed network.

14. The method of claim 13 wherein the networking protocol is the transmission control protocol (TCP).

15. A computer-readable storage media having a software program thereon executable on a computing device to perform a method of discovering device services in ad-hoc and server-managed networks of computing devices, the method comprising:
    when the computing device is connected in an ad-hoc network, sending discovery queries for device services as a multicast transmission from the computing device; and
    when the computing device is connected in a server-managed network having a discovery server, sending discovery queries for the devices services from the computing device directly to the discovery server using a networking protocol that guarantees message delivery while suppressing sending any discovery queries for devices services as a multicast transmission; and
    responding to only those discovery queries for the device services received as multicast transmissions that match device services of the computing device itself when the computing device is connected in the server-managed network.

16. The computer-readable storage media of claim 15 wherein the networking protocol is the transmission control protocol (TCP).

17. A computing device for discovering device services of discovery responders in ad-hoc and server-managed networks of computing devices, the computing device comprising:
    means for, when connected in an ad-hoc network, sending discovery queries for device services of the discovery responders as a multicast transmission from a discovery client computing device; and
    means for, when connected in a server-managed network having a discovery server, switching by the computing device into a server-based discovery mode wherein the computing device operates by sending discovery queries for the device services of the discovery responders from the discovery client computing device as a directed transmission to the discovery server using a networking protocol that guarantees message delivery while suppressing sending any discovery queries via multicast transmission, and further by responding to only those discovery queries sent from other discovery clients via multicast transmission that seek discovery of device services of the computing device itself;
    wherein the discovery responders continue to respond to multicast transmission regardless of whether the discovery responders are in ad-hoc or server-managed networks of computing devices.

18. The computing device of claim 17 wherein the networking protocol is the transmission control protocol (TCP).

* * * * *